(12) United States Patent
Johnson et al.

(10) Patent No.: US 7,018,533 B2
(45) Date of Patent: Mar. 28, 2006

(54) HIGH SOLIDS MODULE

(75) Inventors: Warren Thomas Johnson, Grose Vale (AU); Thomas William Beck, North Richmond (AU)

(73) Assignee: U.S. Filter Wastewater Group, Inc., Warrendale, PA (US)

( * ) Notice: Subject to any disclaimer, the term of this patent is extended or adjusted under 35 U.S.C. 154(b) by 0 days.

(21) Appl. No.: 10/802,691

(22) Filed: Mar. 16, 2004

(65) Prior Publication Data

US 2004/0238442 A1    Dec. 2, 2004

Related U.S. Application Data

(63) Continuation of application No. PCT/AU02/01272, filed on Sep. 17, 2002.

(51) Int. Cl.
*B01D 65/02* (2006.01)

(52) U.S. Cl. ............ 210/321.69; 210/650; 210/321.69; 210/321.88

(58) Field of Classification Search ............ 210/321.69, 210/321.79, 321.8, 321.88, 321.89, 323.2, 210/411, 500.23, 636, 650, 791, 798
See application file for complete search history.

(56) References Cited

U.S. PATENT DOCUMENTS

| | | | |
|---|---|---|---|
| 3,228,876 A | 1/1966 | Mahon | |
| 3,693,406 A | 9/1972 | Tobin | |
| 3,708,071 A | 1/1973 | Crowley | |
| 3,968,192 A | 7/1976 | Hoffman et al. | |
| 3,992,301 A | 11/1976 | Shippey et al. | |
| 4,188,817 A | 2/1980 | Steigelmann | |
| 4,192,750 A | 3/1980 | Elfes et al. | |
| 4,193,780 A | 3/1980 | Cotton et al. | |
| 4,218,324 A | 8/1980 | Hartmann et al. | |
| 4,248,648 A | 2/1981 | Kopp | |
| 4,384,474 A | 5/1983 | Kowalski | |
| 4,385,150 A | 5/1983 | Miyake et al. | |
| 4,451,369 A | 5/1984 | Sekino et al. | |
| 4,511,471 A | 4/1985 | Müller | |

(Continued)

FOREIGN PATENT DOCUMENTS

DE    4 117 422    11/1992

(Continued)

OTHER PUBLICATIONS

Derwent Abstract Accession No. 2001-142268/15, Class A88, J01 JP, A1, 2000342932 (Mitsubishi Rayon Co. Ltd.), Dec. 12, 2000.

(Continued)

*Primary Examiner*—Joseph Drodge

(57) ABSTRACT

A method of cleaning a membrane filtration module is disclosed. The module comprises at least one or more longitudinally extending membranes located in a feed-containing vessel. The membranes have a permeable wall which is subjected to a filtration operation wherein feed containing contaminant matter is applied to one side of the membrane wall and filtrate is withdrawn from the other side of the membrane wall. The method comprises the steps of suspending the filtration operation; performing a cleaning process on the membrane wall to dislodge contaminant matter from the membrane wall into liquid surrounding the membrane: performing a sweep of the feed-containing vessel substantially parallel to the longitudinally extending membranes to remove the liquid containing the dislodged contaminant matter, at least in part, through an opening in a header or other part of the module, and then recommencing the filtration operation.

6 Claims, 1 Drawing Sheet

U.S. PATENT DOCUMENTS

| | | | |
|---|---|---|---|
| 4,540,490 A | 9/1985 | Shibata et al. |
| 4,547,289 A | 10/1985 | Okano et al. |
| 4,609,465 A | 9/1986 | Miller |
| 4,614,109 A | 9/1986 | Hoffman |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,596 A | 3/1987 | Ellis |
| 4,656,865 A | 4/1987 | Callan |
| 4,660,411 A | 4/1987 | Reid |
| 4,670,145 A | 6/1987 | Edwards |
| 4,673,507 A | 6/1987 | Brown |
| 4,687,561 A | 8/1987 | Kunz |
| 4,688,511 A | 8/1987 | Gerlach et al. |
| 4,718,270 A | 1/1988 | Storr |
| 4,744,240 A | 5/1988 | Reichelt |
| 4,756,875 A | 7/1988 | Tajima et al. |
| 4,763,612 A | 8/1988 | Iwanami |
| 4,767,539 A | 8/1988 | Ford |
| 4,779,448 A | 10/1988 | Gogins |
| 4,784,771 A | 11/1988 | Wathen et al. |
| 4,793,932 A | 12/1988 | Ford et al. |
| 4,797,211 A | 1/1989 | Ehrfeld et al. |
| 4,810,384 A | 3/1989 | Fabre |
| 4,812,235 A | 3/1989 | Seleman et al. |
| 4,816,160 A | 3/1989 | Ford et al. |
| 4,846,970 A | 7/1989 | Bertelsen et al. |
| 4,876,006 A | 10/1989 | Ohkubo et al. |
| 4,876,012 A | 10/1989 | Kopp et al. |
| 4,921,610 A | 5/1990 | Ford et al. |
| 4,931,186 A | 6/1990 | Ford et al. |
| 4,935,143 A | 6/1990 | Kopp et al. |
| 4,999,038 A | 3/1991 | Lundberg |
| 5,005,430 A | 4/1991 | Kibler et al. |
| 5,024,762 A | 6/1991 | Ford et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,076,925 A | 12/1991 | Roesink et al. |
| 5,079,272 A | 1/1992 | Allegrezza et al. |
| 5,094,750 A | 3/1992 | Kopp et al. |
| 5,104,535 A | 4/1992 | Cote et al. |
| 5,104,546 A | 4/1992 | Filson et al. |
| H1045 H | 5/1992 | Wilson |
| 5,137,631 A | 8/1992 | Eckman et al. |
| 5,138,870 A | 8/1992 | Lyssy |
| 5,151,191 A | 9/1992 | Sunaoka et al. |
| 5,151,193 A | 9/1992 | Grobe et al. |
| 5,158,721 A | 10/1992 | Allegrezza et al. |
| 5,182,019 A | 1/1993 | Cote et al. |
| 5,192,456 A | 3/1993 | Ishida et al. |
| 5,194,149 A | 3/1993 | Selbie et al. |
| 5,198,116 A | 3/1993 | Comstock et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,297,420 A | 3/1994 | Gilliland et al. |
| 5,320,760 A | 6/1994 | Freund et al. |
| 5,353,630 A | 10/1994 | Soda et al. |
| 5,361,625 A | 11/1994 | Ylvisaker |
| 5,364,527 A | 11/1994 | Zimmermann et al. |
| 5,389,260 A | 2/1995 | Hemp |
| 5,393,433 A | 2/1995 | Espenan et al. |
| 5,401,401 A | 3/1995 | Hickok |
| 5,403,479 A | 4/1995 | Smith et al. |
| 5,405,528 A | 4/1995 | Selbie et al. |
| 5,417,101 A | 5/1995 | Weich |
| 5,419,816 A | 5/1995 | Sampson et al. |
| 5,470,469 A | 11/1995 | Eckman |
| 5,477,731 A | 12/1995 | Mouton |
| 5,480,553 A | 1/1996 | Yamamori et al. |
| 5,531,848 A | 7/1996 | Brinda et al. |
| 5,531,900 A | 7/1996 | Raghavan et al. |
| 5,543,002 A | 8/1996 | Brinda et al. |
| 5,554,283 A | 9/1996 | Brinda et al. |
| 5,607,593 A | 3/1997 | Cote et al. |
| 5,639,373 A | 6/1997 | Mahendran et al. |
| 5,643,455 A | 7/1997 | Kopp et al. |
| D396,046 S | 7/1998 | Scheel et al. |
| 5,783,083 A | 7/1998 | Henshaw et al. |
| D396,726 S | 8/1998 | Sadr et al. |
| D400,890 S | 11/1998 | Gambardella |
| 5,910,250 A | 6/1999 | Mahendran et al. |
| 5,914,039 A | 6/1999 | Mahendran |
| 5,918,264 A | 6/1999 | Drummond et al. |
| 5,942,113 A | 8/1999 | Morimura |
| 5,944,997 A | 8/1999 | Pedersen et al. |
| 6,024,872 A | 2/2000 | Mahendran |
| 6,039,872 A | 3/2000 | Wu et al. |
| 6,042,677 A | 3/2000 | Mahendran et al. |
| 6,048,454 A | 4/2000 | Jenkins |
| 6,077,435 A | 6/2000 | Beck et al. |
| 6,083,393 A | 7/2000 | Wu et al. |
| 6,146,747 A | 11/2000 | Wang et al. |
| 6,156,200 A | 12/2000 | Zha et al. |
| 6,159,373 A | 12/2000 | Beck et al. |
| 6,193,890 B1 | 2/2001 | Pederson et al. |
| 6,202,475 B1 | 3/2001 | Selbie et al. |
| 6,245,239 B1 | 6/2001 | Cote et al. |
| 6,254,773 B1 | 7/2001 | Biltoft |
| 6,294,039 B1 | 9/2001 | Mahendran et al. |
| 6,303,035 B1 | 10/2001 | Cote et al. |
| RE37,549 E | 2/2002 | Mahendran et al. |
| 6,354,444 B1 | 3/2002 | Mahendran |
| 6,440,303 B1 | 8/2002 | Spriegel |
| D462,699 S | 9/2002 | Johnson et al. |
| 6,524,481 B1 | 2/2003 | Zha et al. |
| 6,547,968 B1 * | 4/2003 | Rabie et al. ................ 210/636 |
| 6,550,747 B1 | 4/2003 | Rabie et al. |
| 6,555,005 B1 | 4/2003 | Zha et al. |
| D478,913 S | 8/2003 | Johnson et al. |
| 6,620,319 B1 | 9/2003 | Behmann et al. |
| 6,641,733 B1 | 11/2003 | Zha et al. |
| 6,645,374 B1 | 11/2003 | Cote et al. |
| 2001/0027951 A1 | 10/2001 | Gungerich et al. |
| 2002/0148767 A1 | 10/2002 | Johnson et al. |
| 2002/0153299 A1 | 10/2002 | Mahendran et al. |
| 2002/0195390 A1 | 12/2002 | Zha et al. |
| 2003/0075504 A1 | 4/2003 | Zha et al. |
| 2003/0089659 A1 | 5/2003 | Zha et al. |
| 2003/0136746 A1 | 7/2003 | Behman et al. |
| 2003/0141248 A1 | 7/2003 | Mahendran et al. |
| 2003/0164332 A1 | 9/2003 | Mahendran et al. |
| 2003/0178365 A1 | 9/2003 | Zha et al. |
| 2003/0205519 A1 | 11/2003 | Zha et al. |
| 2003/0226797 A1 | 12/2003 | Phelps |
| 2003/0234221 A1 | 12/2003 | Johnson et al. |
| 2004/0000520 A1 | 1/2004 | Gallagher et al. |
| 2004/0035782 A1 | 2/2004 | Muller |
| 2004/0084369 A1 | 5/2004 | Zha et al. |
| 2004/0145076 A1 | 7/2004 | Zha et al. |
| 2004/0191894 A1 | 9/2004 | Muller, et al. |
| 2004/0217053 A1 | 11/2004 | Zha et al. |

FOREIGN PATENT DOCUMENTS

| | | |
|---|---|---|
| EP | 0 463 627 B1 | 5/1995 |
| EP | 0 763 758 A1 | 10/1996 |
| EP | 1 052 012 A1 | 11/2000 |
| EP | 920 904 A2 | 12/2000 |

| | | |
|---|---|---|
| EP | 1 350 555 A1 | 10/2003 |
| FR | 2 674 448 A1 | 2/1992 |
| GB | 2 253 572 A | 9/1992 |
| JP | 58-088007 | 5/1983 |
| JP | 61-097006 | 5/1986 |
| JP | 61-107905 | 5/1986 |
| JP | 61-192309 | 8/1986 |
| JP | 61-257203 | 11/1986 |
| JP | 61-263605 | 11/1986 |
| JP | 62-004408 | 1/1987 |
| JP | 62-114609 | 5/1987 |
| JP | 62-140607 | 6/1987 |
| JP | 62-179540 | 8/1987 |
| JP | 63-097634 | 4/1988 |
| JP | 63-143905 | 6/1988 |
| JP | 01-307409 | 12/1989 |
| JP | 63-180254 | 2/1990 |
| JP | 02-164423 | 6/1990 |
| JP | 02-284035 | 11/1990 |
| JP | 03-018373 | 1/1991 |
| JP | 03-028797 | 2/1991 |
| JP | 31-010445 | 5/1991 |
| JP | 04-310223 | 11/1992 |
| JP | 05-023557 | 2/1993 |
| JP | 05-157654 | 6/1993 |
| JP | 06-071120 | 3/1994 |
| JP | 06-114240 | 4/1994 |
| JP | 06-343837 | 12/1994 |
| JP | 07-000770 | 1/1995 |
| JP | 07068139 | 3/1995 |
| JP | 07-185268 | 7/1995 |
| JP | 07-275665 | 10/1995 |
| JP | 08-010585 | 1/1996 |
| JP | 09-141063 | 6/1997 |
| JP | 10-156149 | 6/1998 |
| WO | WO 90/00434 | 1/1990 |
| WO | WO 93/02779 | 2/1993 |
| WO | WO 96/07470 | 3/1996 |
| WO | WO 96/41676 | 12/1996 |
| WO | WO 98/22204 | 5/1998 |
| WO | WO 0030742 | 6/2000 |
| WO | WO 01/36075 | 5/2001 |

OTHER PUBLICATIONS

International Search Report in Corresponding PCT Application No. PCT/AU02/01272.
Almulla et al., Desalination 153 (2002) 237-243.
Rosenberger et al., Desalination 151 (2002) 195-200.
Supplemental EP Search Report (EP02764383) dated Aug. 17, 2005.

* cited by examiner

HIGH SOLIDS MODULE

RELATED APPLICATIONS

This application is a continuation, under 35 U.S.C. §120, of International Patent Application No. PCT/AU02/01272, filed on Sep. 17, 2002 under the Patent Cooperation Treaty (PCT), which was published by the International Bureau in English on Mar. 27, 2003, which designates the United States and claims the benefit of Australian Provisional Patent Application No. PR 7742, filed on Sep. 18, 2001.

FIELD OF THE INVENTION

The present invention relates to membrane filtration systems used with high solids feed and, more particularly, to a method and apparatus for improving the filtration efficiency of such systems by providing an improved cleaning system for the membranes.

BACKGROUND OF THE INVENTION

In a membrane filtration process, the method used to physically clean membranes is of vital importance. An efficient membrane cleaning strategy can maintain a stable permeability of the membrane and reduce the frequency of chemical cleans. A commonly used method to physically clean membranes is a backwash (also called "backflush" or "backpulse") with the permeate/filtrate or a gas. The backwash method is typically used to eject solids blocking the membrane pores and partly dislodge the cake that may have formed on the membrane surface. In a system exposed to a feed containing a high concentration of solids, the fouling occurs more quickly and more severely, in particular, where membranes are densely packed in a module.

Backwash with pressurized gas has proved a very efficient cleaning method and is now widely used in the field of microfiltration processes. The limitation to this method is the membrane pore size. Backwash of membranes with permeate has no limitations to the pore size, but the backwash efficiency is generally lower than gas backwash and the transmembrane pressure (TMP) recovery not enough to offset the fouling rate. Further means are employed to enhance the backwash efficiency, such as dosing chemicals to the backwash permeate, or in combination with gas scrubbing.

Maruyama et al in Japanese Patent No. JP2031200 discloses a hollow fibre membrane backwashing method. The method involves the following sequence: stop filtration, air-scour membrane, fill the membrane vessel, backwash with permeate under pressurized air and drain the waste. This procedure is repeated to achieve a higher efficiency. Sunaoka et al in a U.S. Pat. No. 5,209,852 describes a process for scrubbing hollow fibre membranes in modules. This process is composed of a two-stage air scrubbing and draining to clean the membranes.

In order to minimise footprint and cost, membrane modules are typically manufactured with a high packing density of membranes, usually in the form of fibres. This increases the amount of membrane area for filtration within a module. However, the higher the packing density the more difficult it is to effectively flush solids captured during the filtration process from the membrane bundle. Therefore, improvement in the efficiency of solids removal during backwash allows either higher solids levels to be processed, or higher membrane packing densities to be used, reducing the cost of treatment.

In prior art fibre membrane systems, removal of solids is usually effected by sweeping with feedwater from one end of the module to the other and then out of the module through a side exit port. In this case, solids are first swept along the fibres to the exit end of the module, but must then cross the fibre bundle to exit the module. In high solids applications this requirement for the flow to change direction and pass perpendicular to the fibre bundle to exit the module can lead to accumulation of solids near the exit due to the tendency for the fibres to act like a string filter and capture or hinder the exit of solids from the module at this point.

SUMMARY OF THE INVENTION

The present invention seeks to overcome or at least ameliorate one or more of the disadvantages of the prior art or at least provide a useful alternative.

According to one aspect, the present invention provides a method of cleaning a membrane filtration module, said module including one or more membranes located in a feed-containing vessel and extending longitudinally between vertically spaced upper and lower headers into which the ends of the membranes are potted, the membranes having a permeable wall which is subjected to a filtration operation wherein feed containing contaminant matter is applied to one side of the membrane wall and filtrate is withdrawn from the other side of the membrane wall, at least one of said upper and/or lower headers having one or more openings therein, the method including:

a) suspending the filtration operation;
  b) performing a cleaning process on the membrane wall to dislodge contaminant matter therefrom into liquid surrounding the membrane;
  c) performing a sweep of the feed-containing vessel substantially parallel to the longitudinally extending membranes to remove the liquid containing the dislodged contaminant matter, at least in part, through the openings in the header; and
  d) recommencing the filtration operation.

For further preference, the openings are provided in the lower header and filtrate is withdrawn from the upper header. Preferably, the openings may also be used to introduce gas into the module to produce bubbles for scouring the surface of the membranes during said cleaning process. The sweep may be performed concurrently with the cleaning process. Preferably, the sweep is a high velocity sweep.

The present invention provides for holes or openings in one of the module pots so that solids swept along the membranes during the backwash process continue to flow parallel to the membranes as they exit the module. The requirement for the solids to cross over the fibre bundle to exit at a side port is substantially reduced or eliminated.

The same concept could be applied to submerged membranes operated in an open tank. In the prior art solids are typically removed by draining the tank. As the feed containing the solids drains from the module it must change direction near the bottom to flow out of the module and drain from the tank. By providing holes or openings in the bottom of the module, solids can continue to flow substantially parallel to the fibres as they pass out of the module. This uninterrupted flow provides for more efficient removal of solid from the module and tank.

According to a further aspect, the present provides a method of cleaning a membrane filtration module, said module including one or more membranes located in a feed-containing vessel and extending vertically from an upper header into which proximal ends of the membranes are potted, the membranes having a permeable wall which is subjected to a filtration operation wherein feed containing contaminant matter is applied to one side of the membrane wall and filtrate is withdrawn from the other side of the membrane wall, the method including:

a) suspending the filtration operation;

b) performing a cleaning process on the membrane wall to dislodge contaminant matter therefrom into liquid surrounding the membrane;

c) performing a sweep of the feed-containing vessel substantially parallel to the vertically extending membranes to remove the liquid containing the dislodged contaminant matter, at least in part, through an opening in the module beneath said membranes; and d) recommencing the filtration operation.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENT

Figure 1:
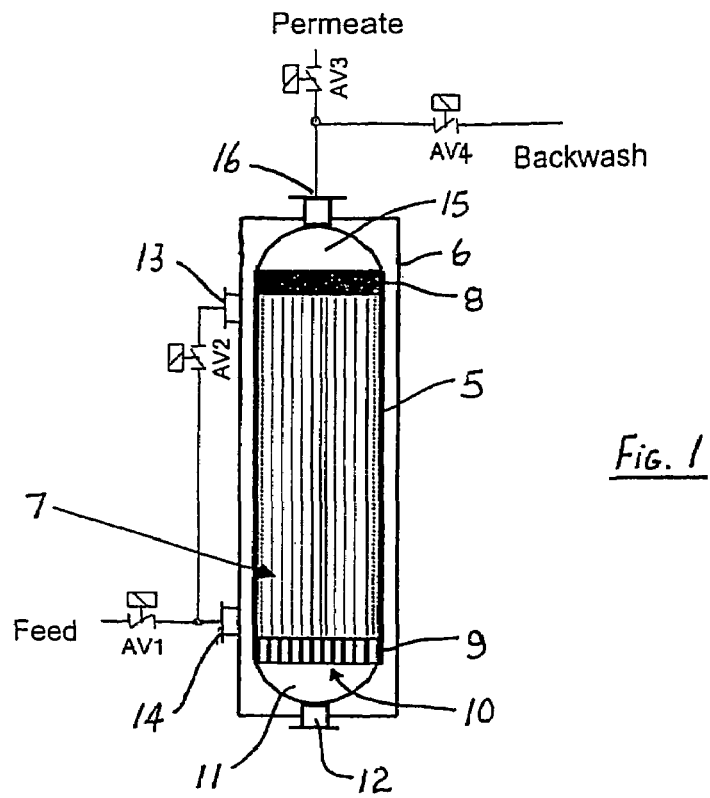
FIG. 1 shows a schematic sectional view of a membrane module according to one embodiment.

Referring to the FIG. 1, the filtration module 5 is mounted within a housing vessel 6 which contains the feed to be filtered. The filtration module 5 contains a bundle or bundles of hollow fibre membranes 7 extending between upper and lower headers 8 and 9, respectively. The lower header 9 is provided with a number of openings 10 communicating with the interior of the fibre bundle and a collection chamber 11 having an inlet/outlet port 12. Feed is supplied through ports 13 and 14 under the control of valves AV1 and AV2. Permeate/filtrate is withdrawn through chamber 15 and port 16 under control of valve AV3. A backwash may also be applied through port 16 under the control of valve AV4.

In use, solids accumulated within the module 5 following filtration and backwash are flushed or swept from the module 5 through the openings 10 by opening port 12 and applying a suitable pressure to the feed within the module 5. Port 12 may also be used to supply gas to openings 10 to provide scouring bubbles within the module 5 to assist cleaning of the fibre membrane surfaces.

Figure 2:
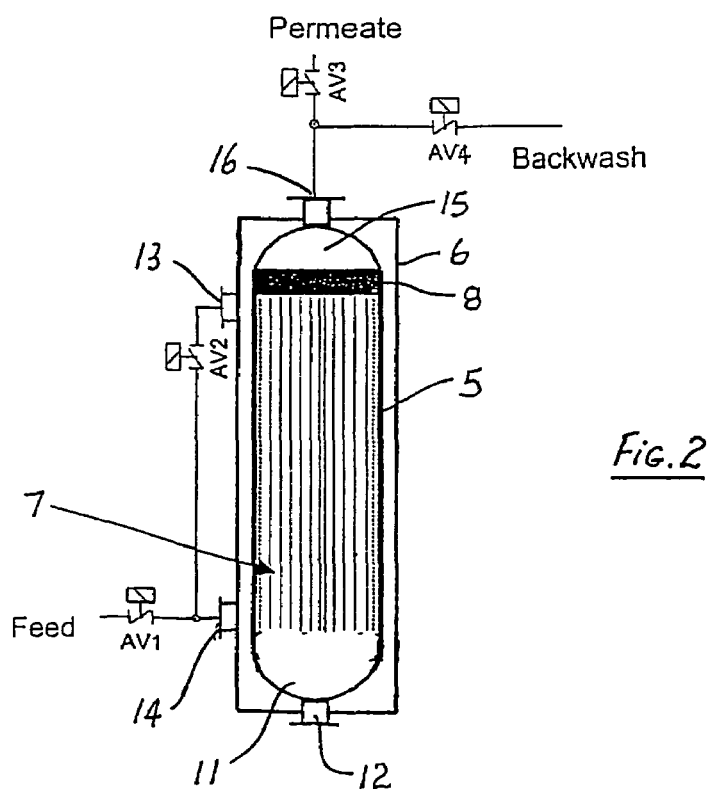
FIG. 2 shows a schematic sectional view of a membrane module according to further embodiment.

FIG. 2 shows a similar arrangement to FIG. 1, however, in this embodiment the hollow fibre membranes 7 are suspended vertically from the upper header 8 and are not potted at their lower distal ends 17. The distal ends 17 of each fibre membrane 7 are closed and filtrate withdrawn through the upper header 8. Backwash in this embodiment is flushed or swept through port 12.

It will be appreciated that further embodiments and exemplifications of the invention are possible with departing from the spirit or scope of the invention described.

What is claimed is:

1. A method of cleaning a membrane filtration module, the module comprising, an upper header, a lower header, and at least one membrane situated in a feed-containing vessel, wherein the membrane extends longitudinally between the upper header and the lower header, wherein a first end of the membrane is potted in the upper header, wherein a second end of the membrane is potted in the lower header, wherein the upper header and the lower header are vertically spaced, wherein at least one of the upper header and the lower header comprises at least one opening, and wherein the membrane comprises a permeable wall, the method comprising:

a) applying a feed comprising at least one contaminant to a first side of the permeable wall and withdrawing a filtrate from a second side of the permeable wall and through a first vessel port;

b) suspending applying the feed and withdrawing the filtrate;

c) cleaning the permeable wall by applying a backwash, whereby the contaminant is dislodged from the permeable wall and into a liquid surrounding the membrane;

d) sweeping the feed-containing vessel with feed in a direction substantially parallel to the membrane, whereby the liquid containing contaminant is removed through the opening and through a second vessel port; and e) recommencing applying the feed and withdrawing the filtrate.

2. The method according to claim 1, wherein the opening is in the lower header and wherein the filtrate is withdrawn from the upper header.

3. The method according to claim 1, further comprising:

f) introducing a gas into the module through the opening, whereby bubbles are produced which scour the permeable wall during cleaning.

4. The method according to claim 1, wherein sweeping is performed concurrently with cleaning.

5. The method according to claim 1, wherein sweeping is high velocity sweeping.

6. The method according to claim 1, wherein sweeping is conducted by applying a fluid under pressure to the feed-containing vessel.

* * * * *